Feb. 15, 1966

A. G. POKRANT 3,235,749

ELECTRONIC REGISTRY DEVICES

Filed June 1, 1962

2 Sheets-Sheet 1

INVENTOR.
Adolph G. Pokrant.
BY
W. L. Stout
HIS ATTORNEY

Feb. 15, 1966 A. G. POKRANT 3,235,749

ELECTRONIC REGISTRY DEVICES

Filed June 1, 1962 2 Sheets-Sheet 2

INVENTOR.
Adolph G. Pokrant.
BY
W. ~ Stout
HIS ATTORNEY 3,235,749

ELECTRONIC REGISTRY DEVICES

Adolph G. Pokrant, Braddock Hills, Pa., assignor to Westinghouse Air Brake Company, Wilmerding, Pa., a corporation of Pennsylvania Filed June 1, 1962, Ser. No. 199,359
9 Claims. (Cl. 307—88.5)

This invention relates to electronic registry devices, and more particularly to a transistor circuit arrangement which functions to store information indicative of an existing field condition.

In high speed code systems, for example of the type disclosed in the publication titled "Frequency Shift Carrier System," Union Development UD 293, February 1960, codes may be sent out from a central office location to a field location for controlling a field function, and thereafter transmitted codes are sent from said field location back to the control office location for indicating said field function at the rate of approximately 25 (twenty-five) steps per second. It is desirable and advantageous to have a registry unit that will store or register information obtained during the stepping action of the indication relays, and one which will display said information until the field function correspondingly changes position. It is noted, that high speed code systems of this particular type usually consist of stepping relays arranged in such a manner that the indicating information to be stored or registered will only be available for action for a time period of one-tenth to one millisecond. Upon correct reception of the information a relatively long lapse of time, for example, approximately one second, may be tolerated before the information is displayed. The conveying or displaying medium may be a lamp on a panel board which is energized during one field position and de-energized during the other field position or may be a relay which is picked up by a certain field condition and released by another field condition. Electronic registry units as disclosed herein are utilized to convey and store information concerning the functional manipulation and position of an existing field condition.

The present invention in general utilizes a bistable or flip-flop circuit consisting of an improved multivibrator stage, analogous to the well-known "Eccles-Jordan Circuit." The bistable multivibrator circuit involves the use of two transistors or semiconductive devices which are caused to conduct alternatively by the application of "triggering" pulses to a constant electrode of the circuit. Such switching circuits normally are referred to as bistable since there are two stable operating conditions, namely, when one of the transistors is turned "on" while the other transistor is turned "off" and vice versa. The bistable multivibrator is initially at rest in either of the stable states. When triggered by an input triggering pulse, the circuit switches to the second stable state where it remains until triggered by another pulse. While many switching circuits of this particular type provide stable operation and a high degree of accuracy; it has been found that they are susceptible to false triggering pulses which cause erratic operation thereof when used in a system employing relays. Spurious voltages due to noise and transient voltages caused by relays when current through them is switched off are likely to trigger the multivibrator and result in a false operation and an untrue indication.

It is therefore a principal object of the instant invention to provide a novel registry device.

It is a further object of the present invention to provide a multivibrator circuit having an improved switching operation.

It is still a further object of the present invention to provide a transistor bistable switching arrangement having a high degree of accuracy and increased reliability.

These objects and other advantages are accomplished in one embodiment of this invention by employing a symmetrical, bistable, transistor multivibrator to control a load in response to a particular field condition. The multivibrator comprises two transistors with a capacitor interconnecting the base electrode of each transistor for providing a time delaying action. The emitters of the transistors are connected to the positive terminal of the supply potential through a plurality of series diodes which keep the emitters referenced to a relatively fixed voltage and provide a bias voltage when only a single power supply is used. Input triggering pulses are applied to the base electrode of one transistor to switch this transistor into a conductive or non-conductive state. For example, a negative input pulse will trigger a non-conducting P-N-P transistor in a conductive state while a positive pulse will trigger a conducting P-N-P transistor into a non-conductive state. An additional transistor is controlled in response to the particular state of one of the transistors of the multivibrator. The output of the additional transistor is connected to a load, in this instance, a relay, which is picked up when the latter transistor is conducting and released during a non-conducting period. The condition of the relay therefore provides an indication means representative of an existing field position.

Other objects of my invention will become apparent from the following description thereof when taken in connection with the accompanying drawings wherein.

Figure 1:
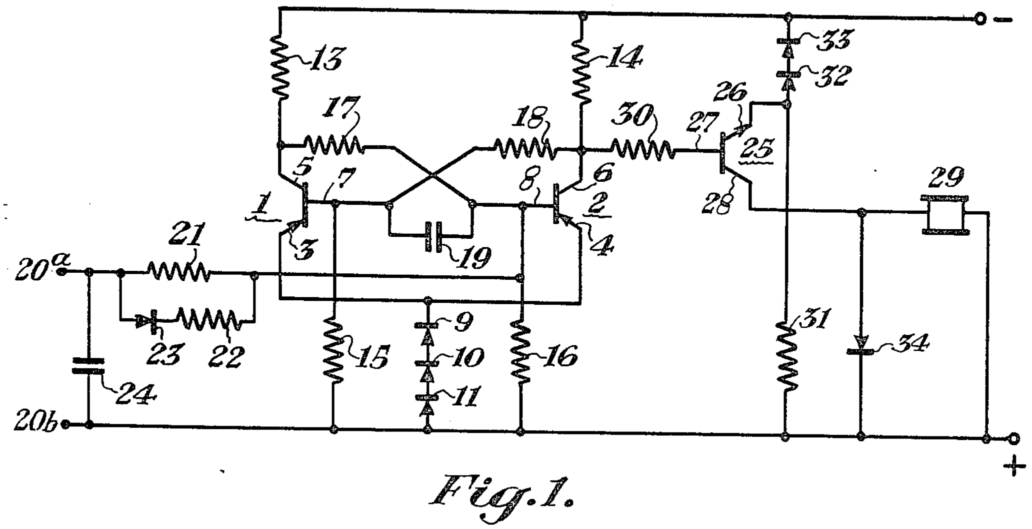
FIG. 1 is a schematic diagram illustrating the preferred form of the registry unit.

Referring now to the drawings, wherein like parts are indicated by like reference numerals in each figure, and referring particularly to FIG. 1, the circuit includes a bistable multivibrator comprising a pair of transistors 1 and 2 of like conductivity types and which may be considered, by way of example, as P-N-P junction transistors. The emitters 3 and 4 of transistors 1 and 2, respectively, are connected to the positive (+) terminal of the power supply, which may be any conventional filtered direct current power supply, through a plurality of serially connected diodes 9, 10 and 11. The diodes 9, 10 and 11 are connected in series to provide a regulated reference voltage of sufficient magnitude for proper operation of the circuit. First, these diodes provide a bias voltage to supply Icbo (collector-base-leakage current) for transistors 1 and 2 during their non-conducting period, and thereby eliminate the need of an additional power supply for this specific purpose. Further, superior performance and increased sensitivity results from the use of these diodes since only very slight variations of the voltage occur due to changes of the voltage of the power supply so that the emitter electrodes of the transistors are referenced to a relatively fixed voltage. Second, the diodes 9, 10 and 11 raise the voltage at the emitter electrodes of transistors 1 and 2, thereby permitting the triggering pulses applied to the base electrode to be positive with respect to the emitter electrode of transistor 2, and conversely, making it possible for triggering pulses applied to the base electrode to be negative with respect to the emitter electrode of transistor 2. The collector 5 of transistor 1 is connected to the negative (—) terminal of the power supply through resistor 13; similarly, collector electrode 6 of transistor 2 is connected to the negative (—) terminal of the power supply through resistor 14. A resistor 15 connects base electrode 7 of transistor 1 to the positive (+) terminal of the power supply, and similarly, resistor 16 connects base electrode 8 of transistor 2 to the positive (+) terminal of the power supply. The base electrode 7 of transistor 1 is coupled to the collector electrode 6 through a coupling resistor 18. The base electrode 8 of transistor 2 is coupled to the collector electrode 5 through a coupling resistor 17. A delaying capacitor 19, the operation of which will be described in detail hereinafter, interconnects the base electrodes 7 and 8 of transistors 1 and 2, respectively.

Input triggering pulses from any convenient source, representative of field conditions, may be applied to the circuit through a pair of terminals 20*a* and 20*b*, one of which is connected to the positive (+) terminal of the power supply and the other of which is connected to the base electrode 8 of transistor 2 through a current limiting network. This network comprises a resistor 21 for limiting the amount of current passing therethrough during a negative input pulse, and resistor 22 and diode 23 serially connected and in parallel with resistor 21 for limiting current flow during a positive input pulse. It is noted, that the resistance of series resistor 22 and diode 23 is lower than the resistance of resistor 21. This dissimilarity in the resistance dimensions is required because of the difference in the relative magnitude between the negative and positive input pulses. Capacitor 24 connected across terminals 20*a* and 20*b* is utilized as a filter, in a conventional manner, to eliminate some noise and transient voltages of very short time duration.

A driver transistor 25 of an opposite conductivity type to transistors 1 and 2, for example, an N-P-N type, is provided to energize and de-energize a relay 29 in accordance with the particular conducting state of transistor 25. The base electrode 27 of transistor 25 is connected to the collector electrode 6 of transistor 2 through resistor 30. A voltage divider including resistor 31 and diodes 32 and 33 is connected across the positive (+) and negative (—) terminals of the power supply. The emitter 26 of transistor 25 is connected to a junction point between resistor 31 and diodes 32 and 33 in such a manner that transistor 25 is reversely biased during a non-conducting state of transistor 2. As will be appreciated, during the cut-off period of transistor 2 the resistors 14 and 30 provide a path for Icbo (collector-base-leakage current) of transistor 25. Relay 29 is connected from the positive (+) terminal to the negative (—) terminal of the power supply by means of the collector 28 and emitter 26 of transistor 25 and through diodes 32 and 33. Diode 34 connected across relay 29 operates, in the well-known manner, to minimize transient voltages developed by the relay during de-energization.

In the following details of the operation of the embodiment shown in FIG. 1, it is assumed that transistor 2 is conducting heavily or in saturation while transistor 1 is non-conducting or switched "off". Each transistor is held in its particular state by the condition of the other. When transistor 1 is cut off, its output resistance is high and its collector current is negligible, however, with some flow of leakage current (Icbo). Current flows through the voltage divider comprising resistors 13, 17 and 16 due to the power supply source causing a finite value of voltage drop across each resistor. The voltage across 16 is slightly greater than the reference voltage developed across diodes 9, 10 and 11 thereby causing a forward bias on transistor 2 and retaining this transistor in a conducting state. The high collector current of transistor 2 flows through resistor 14 and causes a high voltage drop across resistor 14 which is substantially equal to the potential of the power supply minus voltage drop across diodes 9, 10 and 11, considering the voltage drop across the emitter-collector electrodes of transistor 2 as a negligible amount. Therefore, the voltage drop across resistor 15 is comparatively smaller than the reference voltage across diodes 9, 10 and 11 which in turn causes a reverse bias on transistor 1 thereby retaining this transistor in a non-conducting state.

With the transistor 2 conducting heavily, the voltage drop across the collector load resistor 14 is of sufficient magnitude and in a direction to overcome the reference bias voltage developed across the diodes 32 and 33, and thereby causing the control transistor 25 to conduct. With transistor 25 in a conductive state, current flows through relay 29 causing the relay to be energized or picked up.

With transistor 2 conducting and transistor 1 cut off, as described, if a positive triggering pulse is applied to terminals 20, the following events take place within the circuit. The input pulses, representing a field function, normally, have a width or time duration varying between one-tenth (0.1) of a millisecond to approximately one (1.0) millisecond. Due to the charge accumulated on capacitor 19 during the quiescent period, it is apparent that a positive triggering pulse is delayed from initiating any switching action of transistor 2 until the capacitor charge is changed.

In an RC circuit, the time required to discharge a capacitor to any value is directly proportional to the values of the capacitance and resistance of the circuit.

Since the base-to-base circuit of transistors 1 and 2 has a very high impedance level, a longer delay time in switching the transistors is possible with a smaller value of capacitance. Further, since the non-conducting transistor is normally reverse biased, the voltage across the capacitor 19 has to change over a greater range than if capacitors were merely connected from the base-to-emitter of the transistors. This causes a longer time delay. Therefore, it is readily apparent that the circuit is less sensitive to pulses of very short time duration, and that the triggering pulses must have a predetermined time duration, fixed by the values of the capacitance and resistance, before any effective switching of the multivibrator takes place.

With a positive triggering pulse representative of a field function of sufficient time length applied to the base 8 of transistor 2, the transistor 2 is cut off due to the reverse biasing of the base electrode. The decrease in collector current of transistor 2 causes the collector voltage to rise. This change in voltage is coupled to the base of transistor 1 and increases its forward bias, and conduction of transistor 1 begins to increase. The collector voltage of transistor 1 is decreased due to rise in the collector current. This change in voltage is coupled to the base of transistor 2, making the base more positive and decreasing the conduction of the transistor 2. This action continues until transistor 1 is in saturation and transistor 2 is completely cut off. With the transistor 2 cut off the voltage drop across resistor 14 effectively disappears, and transistor 25 is reverse biased by the voltage drop across diodes 32 and 33 wherein transistor 25 is placed in a non-conducting state. With transistor 25 not conducting the current through relay 29 ceases to flow and relay 29 is released indicating a field function has undergone a change in position. The registry circuit operates in a converse manner if now a negative triggering pulse representing a field function is of sufficient time duration to switch the circuit into its other quiescent condition.

Figure 2:
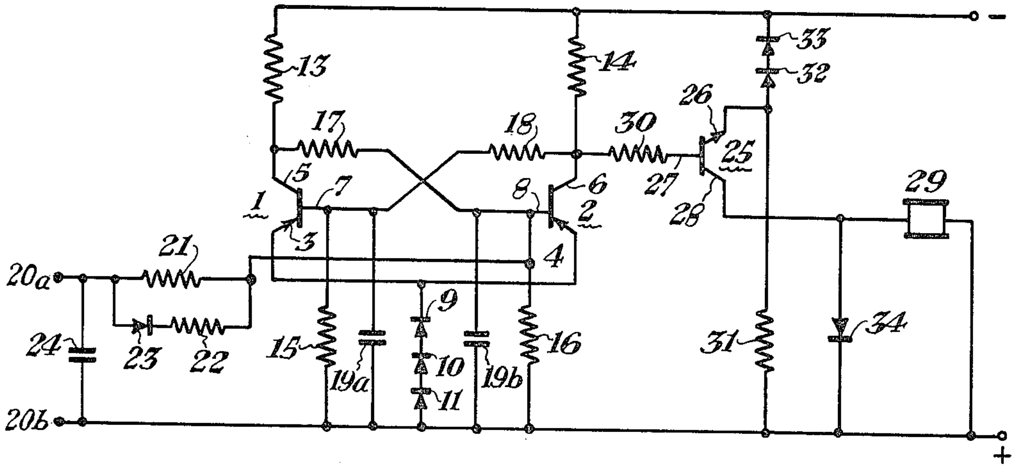
FIG. 2 is a schematic diagram showing a first modification of the registry unit.

Referring now to FIG. 2, a registry circuit arrangement of the same general type as the circuit illustrated in FIG. 1 includes a bistable multivibrator having a pair of transistors 1 and 2 which may be considered to be by way of example, P-N-P junction type transistors. The emitters 3 and 4 of transistors 1 and 2, respectively, are connected to the positive (+) terminal of the power supply, which may be any type conventional filtered direct current power supply, through a plurality of serially connected diodes 9, 10 and 11. The diodes 9, 10 and 11 provide the same advantages of operation herein, as previously set forth with respect to circuit of FIG. 1. The collector 5 of transistor 1 is connected to the negative (—) terminal of the power supply through resistor 13; similarly, collector electrode 6 of transistor 2 is connected to the negative (—) terminal of the power supply through resistor 14. A resistor 15 connects base electrode 7 of transistor 1 to the positive (+) terminal of the power supply, and similarly, resistor 16 connects base electrode 8 of transistor 2 to the positive (+) terminal of the power supply. The base electrode 7 of transistor 1 is coupled to the collector electrode 6 through a coupling resistor 18. The base electrode 8 of transistor 2 is coupled to the collector electrode 5 through a coupling resistor 17. Delaying capacitors 19*a* and 19*b* connect the base electrodes 7 and 8 of transistors 1 and 2, respectively, to the positive (+) terminal of the power supply. While it will be understood that capacitors 19*a* and 19*b* operate in the same manner as delay capacitor 19 of FIG. 1, it is noted, in order to acquire the same amount of delaying time the capacitors 19*a* and 19*b* must be approximately twice as large as the capacitor 19 which interconnects the base electrodes of transistors 1 and 2 of FIG. 1.

Input triggering pulses from any convenient source, representative of field conditions, may be applied to the circuit through a pair of terminals 20*a* and 20*b*, one of which is connected to the positive (+) terminal of the power supply and the other of which is connected to the base electrode 8 of transistor 2 through a current limiter network. This network, as previously mentioned, comprises a resistor 21 for limiting the amount of current passing therethrough during a negative input pulse, and resistor 22 and diode 23 serially connected and in parallel with resistor 1 for limiting current flow during a positive input pulse. It is noted, that the resistance of series resistor 22 and diode 23 is lower than the resistance of resistor 21. This dissimilarity in the resistance dimensions is required because of the difference in the relative magnitudes of the negative and positive input pulses. Capacitor 24 connected across terminals 20*a* and 20*b* is utilized as a filter, in a conventional manner, to eliminate some noise and transient voltages of a very short time duration.

A driver transistor 25 of an opposite conductivity type to transistors 1 and 2, for example, an N-P-N type, is provided to energize and de-energize a relay 29 in accordance with the particular conducting state of transistor 25. The base electrode 27 of transistor 25 is connected to the collector electrode 6 of transistor 2 through resistor 30. A voltage divider including resistor 31 and diodes 32 and 33 is connected across the positive and negative terminals of the power supply. The emitter 26 of transistor 25 is connected to a junction point between resistor 31 and diodes 32 and 33 in such a manner that transistor 25 is reverse biased during a non-conducting state of transistor 2.

As mentioned before, during the cut-off period of transistor 2 the resistors 14 and 30 provide a path for Icbo (collector-base-leakage current) of transistor 25. Relay 29 is connected from the positive (+) terminal to the negative (—) terminal of the power supply by means of the collector 28 and emitter 26 of transistor 25 and through diodes 32 and 33. Diode 34 connected across relay 29 operates, in the well-known manner, to minimize transient voltages developed by the relay during re-energization.

In operation, the circuit illustrated in FIG. 2, will be substantially identical to the one illustrated in FIG. 1 except, of course, that the time delay of switching the transistors 1 and 2 will be determined by capacitors 19*a* and 19*b* which must be nominally two times as large as capacitor 19 in order to achieve approximately the same delay time. As is readily apparent, the reason for the increase in value of capacitors 19*a* and 19*b* is due to lesser value of resistance in the RC circuit which determines the time required for sufficiently changing the charge on the capacitors so that the triggering pulses may initiate switching of the multivibrator.

Figure 3:
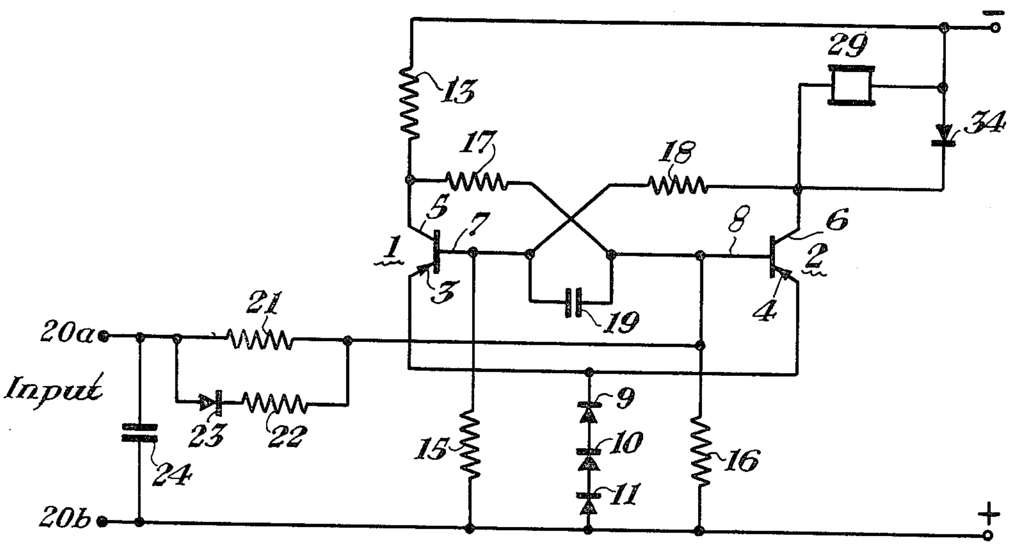
FIG. 3 is a schematic diagram of a second modification of the registry unit.

FIG. 3 shows a modification of the circuit of FIG. 1, the difference lying in the elimination of transistor 25. In FIG. 3, the circuit includes a bistable multivibrator comprising a pair of transistors 1 and 2 of like conductivity types and which may be considered, by way of example, as P-N-P junction transistors. The emitters 3 and 4 of transistors 1 and 2, respectively, are connected to the positive (+) terminal of the power supply, which may be any type conventional filtered direct current power supply, through a plurality of serially connected diodes 9, 10 and 11.

The collector 5 of transistor 1 is connected to the negative terminal of the power supply through resistor 13. A resistor 15 connects the base electrode 7 of transistor 1 to the positive (+) terminal of the power supply, and similarly, resistor 16 connects base electrode 8 of transistor 2 to the positive (+) terminal of the power supply. The base electrode 7 of transistor 1 is coupled to the collector electrode 6 through a coupling resistor 18. The base electrode 8 of transistor 2 is coupled to the collector electrode 5 through a coupling resistor 17. A delaying capacitor 19, the operation of which was described in detail heretofore, interconnects the base electrodes 7 and 8 of transistors 1 and 2, respectively.

Again, input triggering pulses from any convenient source, representative of field conditions, may be applied to the circuit through a pair of terminals 20*a* and 20*b*, one of which is connected to the positive (+) terminal of the power supply and the other of which is connected to the base electrode 8 of transistor 2 through a current limiter network. This network, as mentioned before, comprises a resistor 21 for limiting the amount of current passing therethrough during a negative input pulse, and resistor 22 and diode 23 for limiting current flow during a positive input pulse. It is noted, that the resistance of series resistor 22 and diode 23 is lower than the resistance of resistor 21. Capacitor 24 connected across terminals 20*a* and 20*b* is utilized as a filter, in a conventional manner, to eliminate some noise and transient voltages of very short time duration.

Relay 29 is connected from the collector electrode 6 of transistor 2 to the negative (—) terminal of the power supply. Diode 34 is connected in parallel with relay 29, and operates, as previously mentioned, to minimize transient voltages caused by the relay when current through it is switched off.

This modification differs from that illustrated in FIG. 1, primarily, in the elimination of the driver transistor circuit. As illustrated in the figure, when power capacities permit, the relay 29 is substituted for one of the collector load resistors so that the relay may be directly driven by one of the multivibrator transistors. As is apparent from FIG. 3 the control path for relay 29 extends from the positive (+) terminal of the power supply through diodes 9, 10 and 11, through the emitter-collector circuit of transistor 2, through relay 29 to the negative (—) terminal of the power supply so that the energization and de-energization of the relay is directly responsive to the conductive state of transistor 2. Otherwise, the circuit of FIG. 3 functions in substantially the same manner as the circuit of FIG. 1.

It is noted, that as the switching action of the transistor is delayed or slowed, the time that the transistor is in a high dissipation region increases. Accordingly the maximum delay time is limited by the thermal capabilities of the transistor.

Further, the circuits are designed to operate over a temperature range of —30° F. (—34° C. approx.) to +150° F. (+65° C. approx.), these operating temperatures being dependent upon the component values, the forward voltage drop of the diodes and the collector-base leakage current and gain characteristics of the transistors.

As is well known to those skilled in the art the use of transistors having an opposite type of conductivity may likewise be utilized in the present invention.

Although the invention has been described and illustrated in detail, it is clearly understood that the invention is not limited to the exact form and use indicated and that variations may be made in the particular design and configuration without departing from the scope of the invention, as set forth in the appended claims.

Having thus described my invention, what I claim is:

1. An electronic information storage device comprising: a bistable multivibrator including first and second transistors of a first type, each of said transistors having base, emitter and collector electrodes, a third transistor of a complementary type having base, emitter and collector electrodes, load means, means connecting a source of power supply to said device, means connecting a source of triggering pulses of a predetermined time duration to the input of one of said first and second transistors for switching the quiescent state of said multivibrator, means coupled to the input of said multivibrator for providing that switching of said multivibrator is accomplished only when pulses having a time duration at least equal to the time duration of said triggering pulses are applied to the input of said multivibrator, the input of said third transistor coupled to the output of one of said first and second transistors whereby the conductive condition of said third transistor is controlled by the quiescent state of one of said first and second transistors, said load means connected to the output of said third transistor and responsive to the conductive condition of said third transistor.

2. In an electronic registry system, a bistable multivibrator including a first and second transistor, each transistor having base, emitter and collector electrodes, a third transistor having base, emitter and collector electrodes, a source of operating potential connected to said transistors, means applying a source of triggering pulses of a predetermined time duration to the base of first transistor for switching the quiescent state of said multivibrator, means connnected to the base electrodes of said first and second transistors for providing that noise pulses having a shorter time duration than the time duration of said triggering pulses are incapable of switching said multivibrator, means connected to the emitter electrodes of said first and second transistors for reverse-biasing the non-conducting transistor of said multivibrator, means coupling the base electrode of said third transistor to the collector electrode of said first transistor for controlling the conductive state of said third transistor, and means coupled to the emitter electrode of said third transistor for reverse-biasing said third transistor during a non-conductive period, the collector electrode of said third transistor connected to means for deriving an output signal in accordance with the conductive state of said third transistor.

3. In an electronic registry circuit, a bistable multivibrator including a pair of P-N-P transistors, each transistor having base, emitter and collector electrodes, an N-P-N transistor having base, emitter and collector electrodes, a source of operating potential connected to said transistors, means connecting a source of triggering pulses to the base electrode of one of said P-N-P transistors for switching the quiescent state of said multivibrator, capacitor means interconnecting the base electrodes of said pair of P-N-P transistors for delaying the switching of said multivibrator for a predetermined time duration so as to provide that transient pulses are unable to switch said multivibrator, diode means connected to the emitter elecrodes of said pair of P-N-P transistors for reverse-biasing said P-N-P transistors during a non-conductive condition, means coupling the base electrode of said N-P-N transtor to the collector electrode of one of said P-N-P transistors for controlling the conductive state of said N-P-N transistor, and diode means coupled to the emitter electrode of said N-P-N transistor for reverse-biasing said N-P-N transistor during a non-conductive condition, the collector of said N-P-N transistor connected to means for deriving an output signal in accordance with the conductive state of said N-P-N transistor.

4. In an electronic registry unit, a bistable multivibrator including a pair of transistors of the same conductivity type, each transistor having base, emitter and collector electrodes, a source of supply potential, the collector electrode of each transistor connected to one terminal of said supply potential through a first impedance means, a plurality of diodes connected between the emitter electrode of each transistor and the other terminal of said supply potential, a capacitor interconnecting the base electrode of each of said transistors, second impedance means connecting the base electrode of each transistor to the other terminal of said supply potential, third impedance means cross-coupling the collector electrode of one transistor to the base electrode of the other transistor, a third transistor of an opposite conductivity type of said pair of transistors, said third transistor having base, emitter and collector electrodes, a fourth impedance means connected between the base electrode of said third transistor, a voltage divider including diode means and a fifth impedance means connected between the terminals of said supply potential, means connecting the emitter electrode of said third transistor to said voltage divider, the collector electrode of said third transistor connected to the other terminal of said supply potential, a source of triggering pulses, means connecting said triggering source to the base electrode of one of said pair of transistors whereby said pair of transistors are alternately switched from one state of conduction to another, said capacitor providing a time delay whereby triggering pulses are delayed from switching the conductive state of said pair of transistors for a predetermined amount of time, said third transistor energized and deenergized in accordance with a particular conductive state of one of said pair of transistors.

5. In an electronic registry unit, a bistable multivibrator including a pair of P-N-P transistors, each transistor having base, emitter and collector electrodes, an N-P-N transistor having base, emitter and collector electrodes, a source of supply potential having positive and negative terminals, means connecting a source of triggering pulses to the base electrode of one of said P-N-P transistors for switching the quiescent state of said multivibrator, a capacitor means connecting the base electrodes of said P-N-P transistors to the positive terminal of said supply potential for providing that switching of said multivibrator is delayed a predetermined time duration so as to ensure that noise pulses are unable to switch said multivibrator diode means connected to the emitter electrodes of said pair of P-N-P transistors for reverse-biasing said P-N-P transistors during a non-conductive condition, means coupling the base electrode of said N-P-N transistor to the collector electrode of one of said P-N-P transistors for controlling the conductive state of said N-P-N transistor, and diode means coupled to the emitter electrode of said N-P-N transistor for reverse-biasing said N-P-N transistor during a non-conductive condition, the collector electrode of said N-P-N transistor connected to means for deriving an output signal in accordance with the conductive state of N-P-N transistor.

6. In an electronic registry unit, a bistable multivibrator including a pair of transistors of the same conductivity type, each transistor having base, emitter and collector electrodes, a source of supply potential, the collector of each transistor connected to one terminal of said supply potential through a first impedance means, a plurality of diodes connected between the emitter electrode of each transistor and the other terminal of said supply potential, a capacitor connecting the base electrode of each transistor to the other terminal of said supply potential, second impedance means connecting the base electrode of each transistor to the other terminal of said supply potential, third impedance means cross-coupling the collector electrode of one transistor to the base electrode of the other transistor, a third transistor of an opposite conductivity type to said pair of transistors, said third transistor having base, emitter and collector electrodes, a fourth impedance means connected between the base electrode of said third transistor and the collector electrode of one of said pair of transistors, a voltage divider including diode means and a fifth impedance means connected between the terminals of said supply potential, the emitter electrode of said third transistor connected to a junction between the diode means and fifth impedance means of said voltage divider, the collector electrode of said third transistor connected to the other terminal of said supply potential, a source of triggering pulses, means connecting said triggering source to the base electrode of one of said pair of transistors whereby said pair of transistors are alternately switched from one state of conduction to another, said capacitor means providing a time delay whereby said triggering pulses are delayed from switching the conductive state of said pair of transistors for a predetermined amount of time, said third transistor energized and de-energized in accordance with a particular conductive state of one of said pair of transistors.

7. In an electronic registry unit, a bistable multivibrator including a first and second transistor, each of said transistors having base, emitter and collector electrodes, a source of supply potential having positive and negative terminals, a plurality of diodes connecting the positive terminal of said supply to the emitter electrodes of said transistors for reverse-biasing each transistor during a non-conductive condition, means connecting a source of triggering pulses to the base electrode of said first transistor for switching the stable condition of said multivibrator, and capacitor means interconnecting the base electrode of each of said transistors for delaying the triggering pulses from switching the stable condition of said multivibrator for a predetermined amount of time, the collector electrode of said first transistor connected to the negative terminal of said supply for deriving an output signal in accordance with the particular condition of said first transistor.

8. In an electronic registry circuit, a bistable multivibrator including a pair of P-N-P transistors, each transistor having base, emitter and collector electrodes, a source of supply potential having positive and negative terminals, diode means connecting the positive terminal of said supply to the emitter electrodes of said transistors for providing a reverse-bias voltage to each transistor during a non-conductive period, a source of triggering pulses having a predetermined time duration for switching the conductive state of said multivibrator applied to the base electrode of one of said pair of transistors, capacitor means interconnecting the base electrode of each of said transistors for providing that pulses having a duration shorter than said predetermined duration are incapable of switching said multivibrator, the collector electrode of one of said pair of transistors connected to the negative terminal of said supply for deriving an output signal in accordance with the conductive state of said one transistor.

9. In an electronic registry unit, a bistable multivibrator including a pair of transistors, each transistor having base, emitter and collector electrodes, a source of supply potential, the collector electrode of each transistor connected to one terminal of said supply potential through first impedance means, a plurality of diodes connected between the emitter electrode of each transistor and the other terminal of said supply potential, a capacitor interconnecting the base electrode of each of said transistors, second impedance means connecting the base electrode of each transistor to the other terminal of said supply potential, third impedance means cross-coupling the collector electrode to the base electrode of each transistor, a source of triggering pulses, means connecting said triggering source to the base electrode of one of said pair of transistors whereby said transistors are alternately switched from one state of conduction to another, said capacitor providing a time delay whereby said triggering pulses are delayed from switching the conductive state of said transistors for a predetermined amount of time.

References Cited by the Examiner

UNITED STATES PATENTS

| | | | |
|---|---|---|---|
| 2,589,833 | 3/1952 | Longmire et al. | 328—111 |
| 2,776,420 | 1/1957 | Woll | 307—88.5 |
| 2,924,788 | 2/1960 | Maurushat | 332—14 |
| 3,008,057 | 11/1961 | Campbell | 307—88.5 |
| 3,069,560 | 12/1962 | Van Auker | 307—88.5 |
| 3,093,756 | 6/1963 | Rywak | 307—88.5 |

JOHN W. HUCKERT, *Primary Examiner.*

DAVID J. GALVIN, *Examiner.*